(12) United States Patent
Kumar

(10) Patent No.: US 8,772,962 B2
(45) Date of Patent: Jul. 8, 2014

(54) POWERED DISTRIBUTION SYSTEMS FOR POWERED RAIL VEHICLES

(71) Applicant: General Electric Company, Schenectady, NY (US)

(72) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/800,393

(22) Filed: Mar. 13, 2013

(65) Prior Publication Data

US 2013/0193750 A1     Aug. 1, 2013

Related U.S. Application Data

(62) Division of application No. 12/774,757, filed on May 6, 2010, now Pat. No. 8,421,266.

(51) Int. Cl.
| | |
|---|---|
| *B60L 1/00* | (2006.01) |
| *B60L 3/00* | (2006.01) |
| *B60R 16/03* | (2006.01) |
| *B60L 11/02* | (2006.01) |
| *B60L 15/32* | (2006.01) |

(52) U.S. Cl.
CPC ............... *B60R 16/03* (2013.01); *B60L 11/02* (2013.01); *B60L 15/32* (2013.01); *B60L 2200/26* (2013.01); *B60L 1/00* (2013.01)
USPC ........... 307/9.1; 105/35; 119/4; 119/5; 119/6; 119/7; 119/9

(58) Field of Classification Search
USPC ....................... 307/9.1, 9.2; 105/35
See application file for complete search history.

(56) References Cited

U.S. PATENT DOCUMENTS

| | | | | |
|---|---|---|---|---|
| 3,701,000 | A * | 10/1972 | Basso et al. | 320/123 |
| 6,233,996 | B1 * | 5/2001 | Klug et al. | 72/249 |
| 7,256,513 | B2 * | 8/2007 | Kumar et al. | 307/9.1 |
| 7,928,597 | B2 * | 4/2011 | Gupta et al. | 307/9.1 |

\* cited by examiner

*Primary Examiner* — Rexford Barnie
*Assistant Examiner* — Toan Vu
(74) *Attorney, Agent, or Firm* — GE Global Patent Operation; John A. Kramer

(57) ABSTRACT

A power distribution system for a rail vehicle includes a propulsion alternator, a first bus, a Head End Power (HEP) alternator, and a second bus. The propulsion alternator is joined to an engine of the rail vehicle. The first bus is joined with the propulsion alternator and is configured to electrically couple the propulsion alternator with a propulsion electric load that propels the rail vehicle. The HEP alternator is joined to the engine. The second bus is joined with the HEP alternator and is adapted to electrically couple the HEP alternator with a non-propulsion electric load of the rail vehicle. The propulsion alternator generates a first electric current to power the propulsion electric load and the HEP alternator separately generates second electric current to power the non-propulsion electric load. The HEP alternator and the second bus are electrically separate from the propulsion alternator and the first bus.

24 Claims, 5 Drawing Sheets

POWERED DISTRIBUTION SYSTEMS FOR POWERED RAIL VEHICLES

CROSS-REFERENCE TO RELATED APPLICATION

This application is a divisional of U.S. application Ser. No. 12/774,757, filed May 6, 2010, the entire disclosure of which is incorporated by reference.

FIELD

The subject matter described herein relates generally to powered rail vehicles.

BACKGROUND

Some known powered rail vehicles include one or more powered units and, in certain cases, one or more non-powered trailing units. The powered units supply tractive force to propel the powered units and trailing units. A "non-powered" unit generally encompasses any rail car without an on-board source of motive power. The non-powered trailing units hold passengers and/or goods. In some cases, the powered units may be referred to as locomotives and may include one or more traction motors. An alternator may be joined with an engine of the powered unit to generate electric current. The current is supplied to tractive motors that provide the motive force that propels the rail vehicle. The powered and/or trailing units may include additional, non-propulsion electric loads that do not propel the rail vehicle but provide other services for passengers. Examples of non-propulsion electric loads include heating, ventilation, and air cooling (HVAC) sub-systems, lights, electric circuits for passenger use, and the like.

The non-propulsion electric loads may be powered by a Head End Power (HEP) system. Some known HEP systems provide power to non-propulsion loads that operate on a fixed voltage and fixed frequency electric current. For example, some known non-propulsion loads that draw power from HEP systems run off of three phase alternating current having a voltage of 480 volts and a frequency of 60 Hz. The HEP systems may receive electric current for the non-propulsion electric loads from the tractive circuit in a transformed manner. For example, a transformer may inductively couple the tractive circuit with an auxiliary circuit that supplies the current to the non-propulsion electric loads. In addition to or as an alternate to the transformer, one or more boost choppers may be provided to increase the voltage on the tractive circuit to a larger voltage on the auxiliary circuit. One or more filters between the tractive and auxiliary circuits may be necessary to remove unwanted frequencies of the current before supplying the current to the non-propulsion loads.

The boost choppers and/or transformers increase or decrease the voltage supplied to the auxiliary circuit from the tractive circuit. The engine of some known rail vehicles operates above a predetermined speed to ensure that sufficient voltage is supplied to both the tractive circuit and the auxiliary circuit. For example, during motoring of the rail vehicle, the engine may operate above a predetermined speed to ensure that sufficient voltage is generated and supplied to the tractive motors. When the rail vehicle is idling in a yard or building, the engine may still need to operate above a predetermined speed to ensure that sufficient voltage is generated and supplied to the non-propulsion loads of the auxiliary circuit. Such a running engine may create substantial and undesirable acoustic noise.

The transformers, boost choppers, and/or filters that are used to change the voltage or filter the current transferred between the tractive and auxiliary circuits may be relatively heavy and may substantially contribute to the weight of the rail vehicle. With increasing weight comes an increasing power demand of the tractive circuit and fuel consumption to propel the rail vehicles.

Some known rail vehicles include two or more separate engines that power the tractive and auxiliary circuits. One engine moves to cause an alternator to generate current for the tractive circuit while another engine moves to cause another alternator to create current for the auxiliary circuit. The inclusion of two or more engines to separately meet the power demands of the tractive and auxiliary circuits adds substantial cost and weight to the rail vehicle. For example, the use of two engines may increase the costs in maintaining the rail vehicle, and the weight of the rail vehicle is increased by the additional engine.

A need exists for a power distribution system of a rail vehicle that supplies electric current to meet the power demands of propulsion and non-propulsion electric loads while avoiding adding significant acoustic noise and/or weight to the rail vehicle, and/or cost in operating and maintaining the rail vehicle.

BRIEF DESCRIPTION

In one embodiment, a power distribution system for a rail vehicle is provided. The system includes a propulsion alternator, a first bus, a Head End Power (HEP) alternator, and a second bus. The propulsion alternator is configured to be joined to an engine of the rail vehicle. The first bus is joined with the propulsion alternator and is configured to electrically couple the propulsion alternator with a propulsion electric load that propels the rail vehicle. The HEP alternator is configured to be joined to the engine. The second bus is joined with the HEP alternator and is adapted to electrically couple the HEP alternator with a non-propulsion electric load of the rail vehicle. The propulsion alternator generates a first electric current to power the propulsion electric load and the HEP alternator separately generates second electric current to power the non-propulsion electric load. The HEP alternator and the second bus are electrically separate from the propulsion alternator and the first bus.

In another embodiment, another power distribution system for a rail vehicle is provided. The system includes an alternator, a bus, and a Head End Power (HEP) motor/generator set. The alternator is configured to be joined to an engine of the rail vehicle and to generate first electric current based on movement of the engine. The bus receives the first electric current from the alternator and supplies the first electric current to a propulsion electric load that propels the rail vehicle. The HEP motor/generator set is joined with the bus and includes a HEP motor powered by the first electric current from the bus and a generator joined with the HEP motor. The generator creates a second electric current for an auxiliary circuit based on movement of the HEP motor to power a non-propulsion electric load of the auxiliary circuit.

In another embodiment, another power distribution system for a rail vehicle is provided. The system includes an alternator and a generator. The alternator is configured to be joined to an engine of the powered unit and generates a first electric current for a propulsion electric load of the rail vehicle based on movement of the engine. The generator is configured to be joined to the engine and includes field windings that receive a field current to generate a magnetic field. The generator creates a second electric current to power a non-propulsion electric load of the rail vehicle. The second electric current that is created by the generator is based on movement of the engine and the field current.

DETAILED DESCRIPTION

Figure 1:
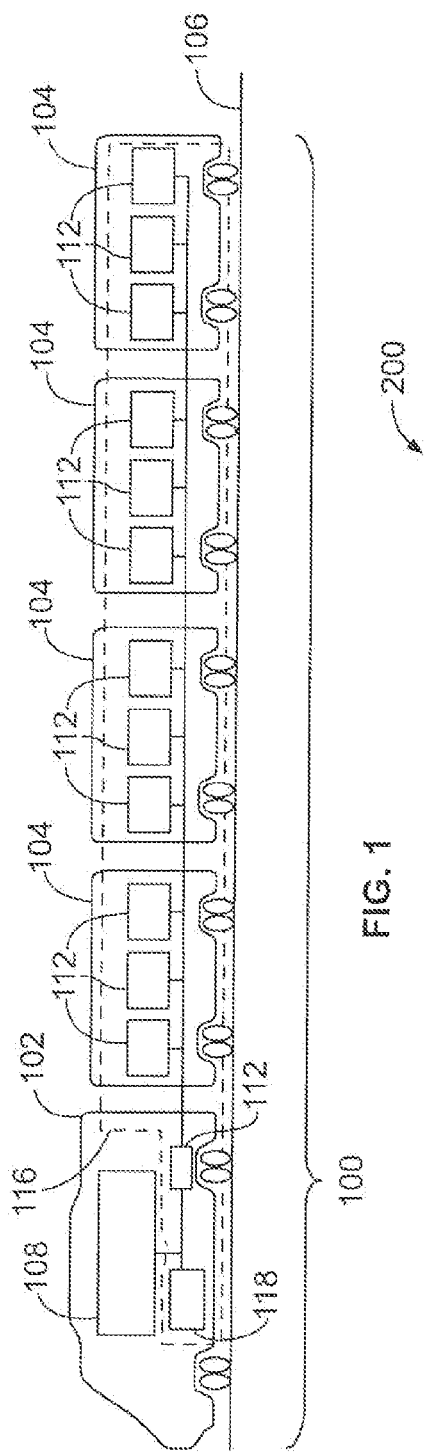
FIG. 1 is a diagram of a powered rail vehicle in accordance with one embodiment.

The foregoing summary, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It should be noted that although one or more embodiments may be described in connection with powered rail vehicle systems having locomotives with trailing passenger cars, the embodiments described herein are not limited to passenger trains. In particular, one or more embodiments may be implemented in connection with different types of rail vehicles and other vehicles. For example, one or more embodiments may be implemented with a vehicle that travels on one or more rails, such as single locomotives and railcars, powered ore carts and other mining vehicles, light rail transit vehicles, and the like. Example embodiments of systems and methods for providing and distributing power to propulsion electric loads of a powered unit of a rail vehicle and to non-propulsion electric loads of the powered unit and/or trailing units, such as passenger cars, are provided. As described below, one or more of these embodiments may provide electric current to the traction motor of the powered unit and to the non-propulsion electric loads of the powered and trailing units without conveying the electric current through a transformer or chopper between the traction motor and the non-propulsion electric loads. At least one technical effect described herein includes a method and system that supplies power for both tractive effort and for non-propulsion auxiliary equipment, such as heating subsystems, cooling subsystems, ventilation subsystems, and the like, in passenger cars without the added weight of a transformer and/or chopper to convey the power to the auxiliary equipment.

FIG. 1 is a diagram of a powered rail vehicle 100 in accordance with one embodiment. The rail vehicle 100 includes a lead powered unit 102 coupled with several trailing cars 104 that travel along one or more rails of a track 106. In one embodiment, the lead powered unit 102 is a locomotive disposed at the front end of the rail vehicle 100 and the trailing cars 104 are passenger cars for carrying passengers and/or storage units for carrying goods along the track 106. The lead powered unit 102 includes an engine 108 that is electrically coupled with propulsion electric loads, such as traction motors 110 (shown in FIG. 3), that propel the rail vehicle 100. By way of example only, the engine 108 may be an electric, diesel, steam, hydrogen, or gas turbine powered engine, or a hybrid of two or more different types of engines. The propulsion electric loads of the lead powered unit 102 may assist in propelling the rail vehicle 100. For example, the propulsion electric loads may include fans or blowers that cool fraction motors 110 (shown in FIG. 3) or to cool the power generation equipment that creates electric current based on movement of the engine 108, such as alternators and the like.

The lead powered unit 102 and/or the trailing cars 104 include one or more non-propulsion electric loads 118, 112 that also receive electric current from the engine 108. The non-propulsion electric loads 112, 118 do not propel (or assist other loads/components in propelling) the rail vehicle 100 along the track 106. For example, the non-propulsion electric loads 112, 118 may provide services to persons in the lead powered unit 102 and/or the passengers in the trailing cars 104. The non-propulsion electric loads 118, 112 may include one or more heating subsystems that heat the air in the lead powered unit 102 and/or trailing cars 104, cooling subsystems that cool the air in the lead powered unit 102 and/or trailing cars 104, ventilation subsystems that ventilate or move air in the lead powered unit 102 and/or trailing cars 104, light sources that illuminate the interiors of the lead powered unit 102 and/or trailing cars 104, batteries that store electric energy for backup or later use, and the like.

The rail vehicle 100 may be referred to as a Head End Power (HEP)-based rail vehicle 100 because the source of the electric power that is supplied to the non-propulsion electric loads 118, 112 is the engine 108 located in the powered unit 102, which may be at or near the front of the rail vehicle 100. The engine 108 provides mechanical energy that is converted into electric current to power the propulsion electric loads, such as the traction motors 110 (shown in FIG. 3), and the non-propulsion electric loads 118, 112. The electric current may be conveyed through a tractive circuit 114 (shown in FIG. 2) and an auxiliary circuit 116. The tractive circuit 114 supplies power to the traction motors 110 and other propulsion electric loads. The auxiliary circuit 116 supplies power to the non-propulsion electric loads 118, 112.

The engine 108 may operate at different speeds. For example, when the rail vehicle 100 is moving along the track 106, the engine 108 may operate at a higher speed, or revolutions per minute (rpm), than when the rail vehicle 100 is stationary and the engine 108 is operating at an idling speed. In accordance with one or more embodiments of the presently described subject matter, various power distribution systems are provided that supply approximately constant voltage to the auxiliary circuit 116 regardless of the speed at which the activated engine 108 is operating. For example, the frequency and/or magnitude of the voltage that is supplied to the auxiliary circuit 116 may be controlled to be within a predetermined range, regardless of the speed at which the engine 108 is operating as long as the engine 108 is rotating at some non-zero frequency. By way of non-limiting example only, the predetermined range may be +/−10% of a predetermined voltage. Alternatively, different ranges such as +/−5%, 20%, or 25% may be used.

The current that is drawn by the propulsion electric loads and the non-propulsion electric loads 112, 118 may vary based on the number and types of traction motors 110 and the non-propulsion electric loads 112, 118 that are turned on and drawing power. For example, the current may vary based on the power demand of the traction motors 110 and the non-propulsion electric loads 112, 118. The speed at which the engine 108 operates may change based on the power demand. For example, as the power demand increases, the engine 108 may speed up while the engine 108 may slow down if the power demand decreases. In one embodiment, the engine 108 may operate at a speed up to 1050 rpm when the power demand is relatively high and may operate down to a speed of 330, 440, or 580 rpm when the power demand is relatively low.

By controlling the voltage that is supplied to the auxiliary circuit 116 to be approximately constant even when the engine 108 slows down to an idling speed, the engine 108 may operate at slower speeds when the rail vehicle 100 is not moving, such as when the rail vehicle 100 is loading and/or unloading passengers. Reducing the speed at which the engine 108 operates reduces acoustic noise of the engine 108 and the amount of fuel consumed by the engine 108.

In one embodiment, the electric current and/or voltage is generated based on movement of the engine 108 and is supplied to the tractive circuit 114 and the auxiliary circuit 116 in a non-transformed manner. For example, current and/or voltage may be supplied to each of the tractive and auxiliary circuits 114, 116 without passing the voltage and/or current through or across a transformer or chopper that connects or is disposed along a conductive pathway between the tractive and auxiliary circuits 114, 116. By eliminating a transformer and/or chopper in the rail vehicle 100 to transfer current between the circuits 114, 116, the weight of the rail vehicle 100 may be significantly reduced.

Figure 2:
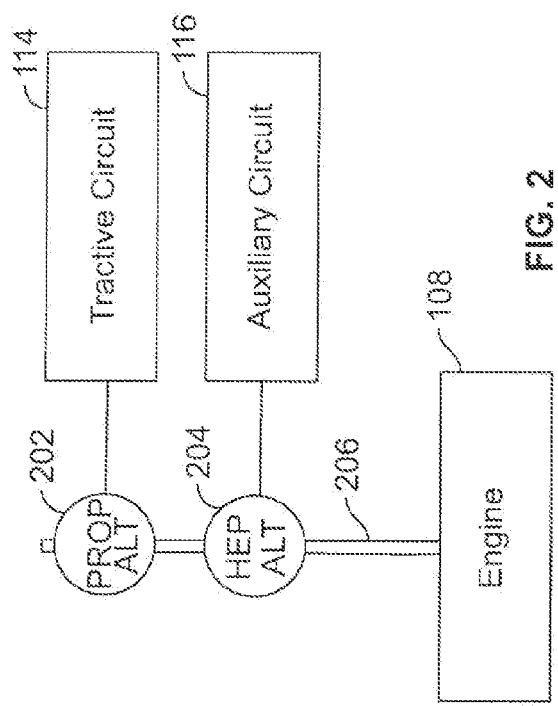
FIG. 2 is a diagram of a power distribution system of the rail vehicle shown in FIG. 1 in accordance with one embodiment.

FIG. 2 is a diagram of a power distribution system 200 of the rail vehicle 100 in accordance with one embodiment. The power distribution system 200 includes two separate alternators 202, 204 that are joined to the engine 108 of the powered unit 102 (shown in FIG. 1) in the rail vehicle 100 (shown in FIG. 1). The alternators 202, 204 include a propulsion alternator 202 ("PROP ALT") and a HEP alternator 204 ("HEP ALT"). In the illustrated embodiment, the propulsion and HEP alternators 202, 204 are coupled to a shaft 206 of the engine 108. Both of the alternators 202, 204 generate current based on common movement of the engine 108. For example, each of the alternators 202, 204 may include a rotor that is coupled to the shaft 206 such that rotation of the shaft 206 causes rotation of the rotors of each of the alternators 202, 204. The engine 108 moves or causes the shaft 206 to rotate at an operating frequency. As the shaft 206 rotates, the alternators 202, 204 each generate electric current, such as three-phase alternating current. While the alternators 202, 204 are described herein as generating three-phase alternating electric current based on movement of the engine 108, one or more of the alternators 202, 204 may be generators that create a different-numbered phase of alternating current or a direct electric current based on movement of the engine 108. (Thus, unless otherwise indicated through a more specific recitation of features, e.g., in the claims, the terms "alternator" and "generator" both refer generally to a device for converting mechanical energy, such as produced by the output shaft of an engine, to electrical energy.)

In the illustrated embodiment, the tractive and auxiliary circuits 114, 116 are electrically isolated/separated from each other. For example, the separate propulsion and HEP alternators 202, 204 provide electrical isolation between the tractive and auxiliary circuits 114, 116 such that electric current is not transferred or transmitted between the tractive and auxiliary circuits 114, 116. As described above, both the propulsion and HEP alternators 202, 204 provide power for the respective tractive and auxiliary circuits 114, 116 without transmitting current between the tractive and auxiliary circuits 114, 116, such as through a transformer or in a transformed manner. The absence of a transformer or chopper to convey current between the tractive and auxiliary circuits 114, 116 may reduce the overall weight of the rail vehicle 100 relative to power distribution systems that include such a transformer.

As shown in FIG. 2, the propulsion alternator 202 is electrically coupled with the tractive circuit 114 and the HEP alternator 204 is electrically joined with the auxiliary circuit 116 while the alternators 202, 204 and the circuits 114, 116 remain electrically separated or isolated from each other. For example, the alternators 202, 204 and circuits 114, 116 may remain separate such that electric current is not conveyed between the alternators 202, 204 or circuits 114, 116, such as by a conductive pathway having a transformer and/or chopper. By way of example only, the circuits 114, 116 may be electrically isolated when there is no pathway between the circuits 114, 116 that transfers current by a conducting current in one circuit 114 to the other circuit 116 over a conductor. In another example, the circuits 114, 116 may be electrically isolated when there is no pathway between the circuits 114, 116 that transfers current by inductively conveying the current in one circuit 114 to the other circuit 116. Electrical isolation or separation does not preclude the sharing of a common ground.

Figure 3:
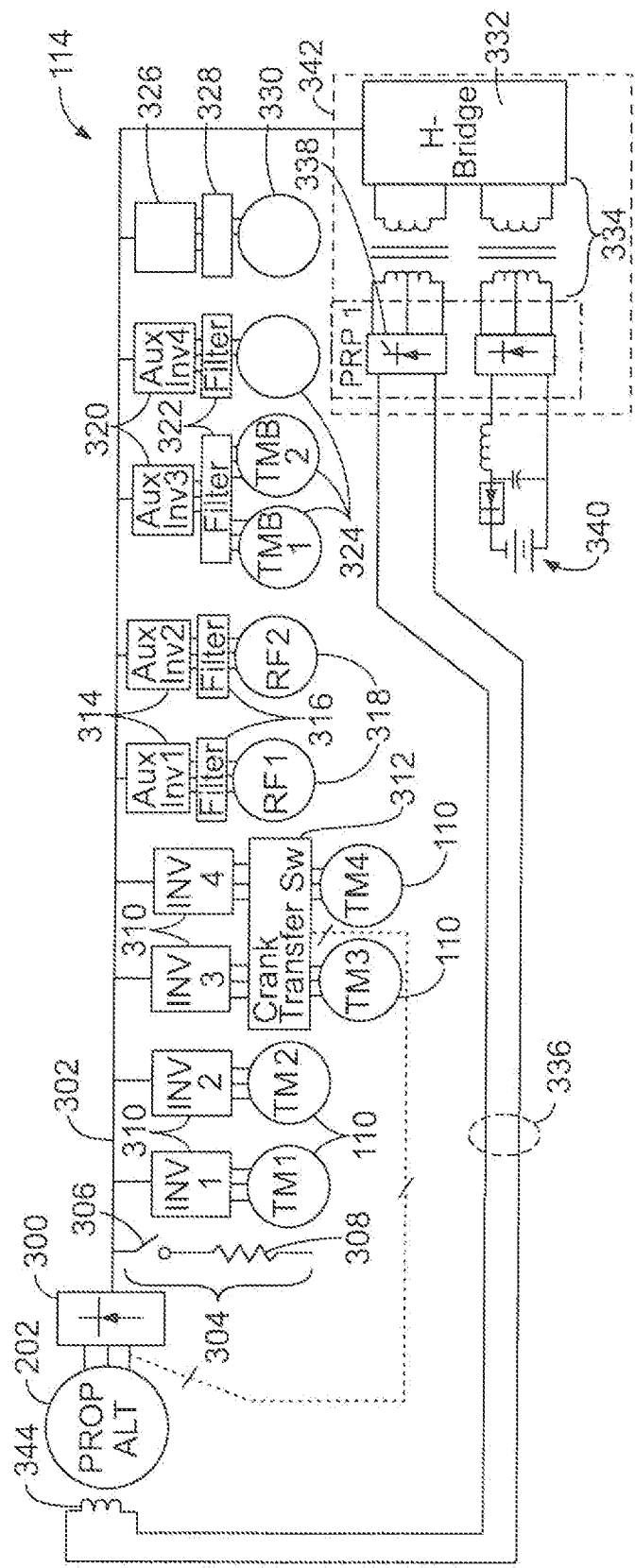
FIG. 3 is a circuit diagram of a tractive circuit of the power distribution system shown in FIG. 2 in accordance with one embodiment.

FIG. 3 is a circuit diagram of the tractive circuit 114 in accordance with one embodiment. The propulsion alternator 202 of the tractive circuit 114 is coupled with the engine 108 (shown in FIG. 1) and provides a three phase alternating current to a rectifier 300. The alternating current may be based on movement of the engine 108 (shown in FIG. 1). For example, the current that is output from the propulsion alternator 202 may be based on the speed at which the engine 108 is rotating the shaft 206 (shown in FIG. 2) and/or a field current of the propulsion alternator 202. The field current is an electric current that is applied to one or more field windings 344 of the propulsion alternator 202. The field current generates a magnetic field or flux of the propulsion alternator 202. A rotor of the propulsion alternator 202 rotates within the magnetic field to generate the current and/or voltage that is output from the propulsion alternator 202.

Changing the speed of the engine 108 varies the voltage that is created by the propulsion alternator 202. The output voltage from the propulsion alternator 202 may increase when the engine 108 increases the speed at which the shaft 206 rotates or decrease as the engine 108 slows down rotation of the shaft 206. The output voltage may be varied by changing the magnitude of the voltage in the field current. For example, increasing the voltage applied to the field windings 344 may increase the magnetic field created by the field windings 344 and the voltage that is output from the propulsion alternator 202 while decreasing the voltage supplied to the field windings 344 decreases the output voltage.

The propulsion alternator 202 generates current based on movement of the engine 108 (shown in FIG. 1) and the field current. The generated current is output from the propulsion alternator 202 and is supplied to the rectifier 300. The rectifier 300 converts the output current to a direct electric current that is conveyed through the tractive circuit 114 along a bus 302. The bus 302 may be referred to as a traction bus, since the bus 302 conveys electric current through at least a portion of the tractive circuit 114. The tractive circuit 114 includes several propulsion electric loads, such as the traction motors 110 ("TM1", "TM2", "TM3", "TM4", and so on), fans 318 ("RF1", "RF2"), motor blowers 324 ("TMB 1", "TMB 2"), and the like. The propulsion electric loads described herein are not intended to be all encompassing or exclusive, as additional components may be included.

In the illustrated embodiment, the propulsion electric loads include one or more grid resistor legs 304. The grid resistor legs 304 consume energy that is created when the rail vehicle 100 (shown in FIG. 1) brakes or slows down. For example, the brakes of the rail vehicle 100 may be regenerative brakes that create electric current when the rail vehicle 100 slows down. This current may be referred to as regenerated current. The regenerated current may be directed to the grid resistor legs 304 where the current is converted into another energy form, such as heat. While only one grid resistor leg 304 is shown, the tractive circuit 114 may include several grid resistor legs 304, such as four or more grid resistor legs 304. The grid resistor leg 304 includes a switch 306 and a resistive element 308. The switch 306 may be controlled to alternate between open and closed states to electrically couple and decouple, respectively, the resistive element 308 with the bus 302. When the switch 306 closes, at least some of the regenerated current is diverted to the resistive element 308. The switch 306 may open to decouple the resistive element 308 from the tractive circuit 114 when the rail vehicle 100 is moving along the track 106 (shown in FIG. 1).

Inverters 310 ("INV 1", "INV 2", "INV 3", "INV 4", etc.) are coupled to the bus 302 between the bus 302 and the traction motors 110. The inverters 310 convert the direct electric current of the bus 302 into an alternating current that is supplied to the traction motors 110 of the propulsion electric loads. A crank transfer switch 312 ("Crank Transfer Sw") may be disposed between the inverters 310 and one or more traction motors 110 to control the supply of current to the traction motors 110 during motoring and to supply the propulsion alternator 202 with current during engine cranking.

Auxiliary inverters 314 ("Aux Inv1", "Aux Inv2") are coupled to the bus 302 between the bus 302 and filters 316. The auxiliary inverters 314 convert the direct current of the bus 302 into an alternating current that is delivered to the filters 316. The filters 316 reduce current that does not have a predetermined frequency or a frequency that falls outside a predetermined range of frequencies. For example, the filters 316 may filter out non-60 Hz components or harmonics of the alternating current that is output from the inverters 314. The alternating current that is output from the filters 316 is delivered to fans 318. The fans 318 may include radiator fans that blow air in the powered unit 102 (shown in FIG. 1). For example, the fans 318 may circulate air to cool a radiator or other component of the engine 108 (shown in FIG. 1).

Auxiliary inverters 320 ("Aux Inv3", "Aux Inv4") and filters 322 of the propulsion electric loads may be joined to the bus 302 to convert the direct current of the bus 302 into alternating current and to filter the current before the current is delivered to one or more traction motor blowers 324 ("TMB 1", "TMB 2"). The traction motor blowers 324 of the propulsion electric loads circulate air about or around the traction motors 110 to cool the traction motors 110. Additional inverters 326, filters 328, and/or other propulsion electric loads 330 may be joined to the bus 302 to draw current from the bus 302. The additional electric loads 330 may be fans, blowers, compressors, electronic devices, traction motors, and the like.

The bus 302 is coupled with a field control component 342 of the tractive circuit 114. The field control component 342 is disposed between the field windings 344 of the propulsion alternator 202 and the propulsion electric loads of the tractive circuit 114, including the grid resistor legs 304, the traction motors 110, the fans 318, the blowers 324, and other loads 330. In the illustrated embodiment, the field control component 342 includes an H-bridge 332, a transformer 334, and a phase control rectifier 338 ("PRP1"). The transformer 334 is joined with a bus 336 that extends from the propulsion alternator 202 to the transformer 334. The phase control rectifier 338 is disposed between the transformer 334 and the propulsion alternator 202 along the bus 336.

The field control component 342 controls the field current that is supplied to the field windings 344 of the propulsion alternator 202. For example, the field control component 342 may change the voltage that is delivered to the field windings 344 in order to vary the magnetic field of the propulsion alternator 202. Changing the magnetic field of the propulsion alternator 202 may change the magnitude of the current, such as the voltage of the current, that is generated by the propulsion alternator 202 based on movement of the engine 108 (shown in FIG. 1).

The field control component 342 may change the voltage of the field current that is delivered to the field windings 344 based on the speed at which the engine 108 (shown in FIG. 1) operates. In one embodiment, the field control component 342 varies the voltage supplied to the field windings 344 in order to ensure that the voltage that is output from the propulsion alternator 202 is approximately constant. For example, the field control component 342 may increase the voltage of the field current when the engine 108 slows down and may decrease the voltage of the field current when the engine 108 speeds up. Varying the voltage of the field current may keep the voltage that is output from the propulsion alternator 202 within a predetermined range of voltages, or between upper and lower predetermined threshold voltages.

In the illustrated embodiment, a battery 340 may be coupled with the field control component 342 and another phase control rectifier 342. The battery 340 may receive and store electric current as a backup or emergency storage of electric power. The battery 340 also may deliver electric current through the tractive circuit 114 when the propulsion alternator 202 does not generate current. For example, the battery 340 may supply electric current when the engine 108 (shown in FIG. 1) is turned off or deactivated.

Figure 4:
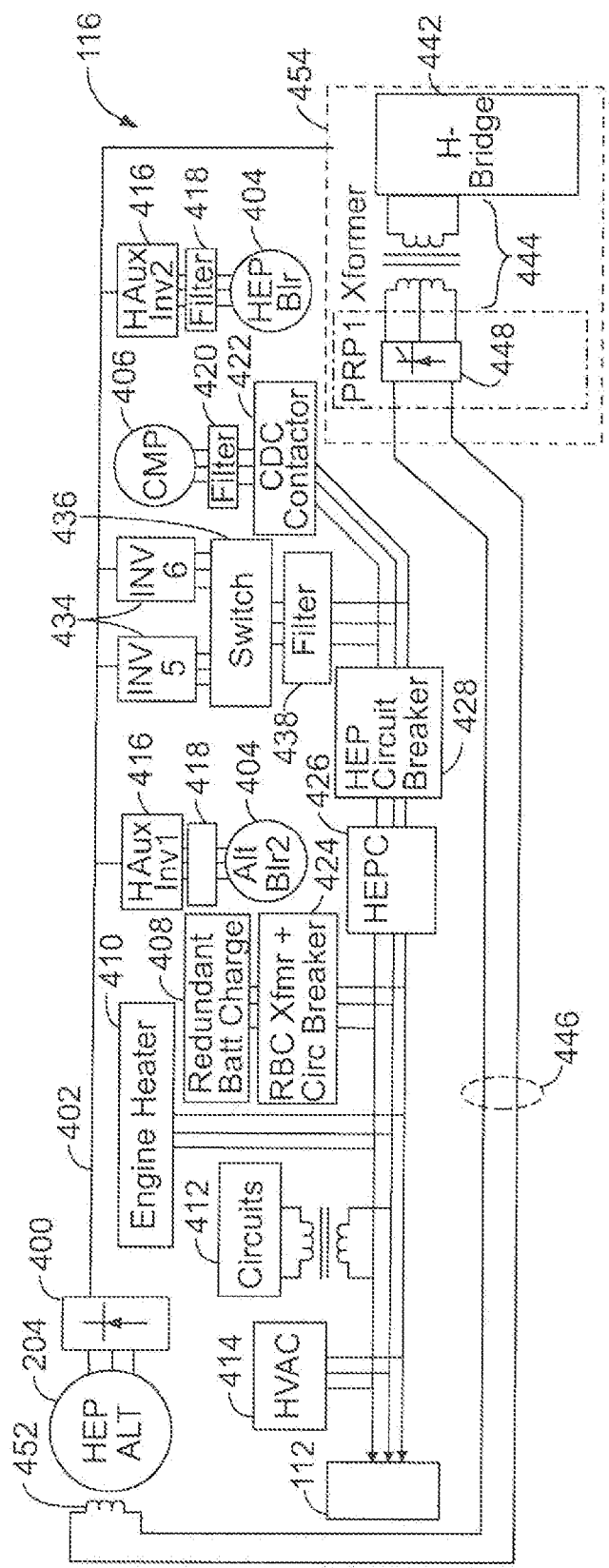
FIG. 4 is a circuit diagram of an auxiliary circuit of the power distribution system shown in FIG. 2 in accordance with one embodiment.

FIG. 4 is a circuit diagram of the auxiliary circuit 116 in accordance with one embodiment. The HEP alternator 204 ("HEP ALT") of the auxiliary circuit 116 may generate a three phase alternating current to a rectifier 400. As described above in connection with the propulsion alternator 202 shown in FIG. 2, the voltage and/or frequency of the alternating current may be based on the speed of movement of the engine 108 (shown in FIG. 1) and/or a field current supplied to one or more field windings 452 of the HEP alternator 204.

The shaft 206 (shown in FIG. 2) of the engine 108 (shown in FIG. 1) rotates and causes the HEP alternator 204 to generate an alternating current in one embodiment. The HEP alternator 204 provides the alternating current to the rectifier 400. The rectifier 400 converts the alternating current to a direct electric current that is conveyed through the auxiliary circuit 116 along a bus 402. The bus 402 may be referred to as an independent auxiliary bus, since the bus 402 is electrically separate or isolated from the tractive circuit 114 (shown in FIG. 1) in the illustrated embodiment.

The auxiliary circuit 116 includes several non-propulsion electric loads 112, 118 (shown in FIG. 1) that may be powered by electric current supplied by the HEP alternator 204. As described above, the non-propulsion electric loads 112, 118 may be located in one or more of the lead powered unit 102 (shown in FIG. 1) and/or the trailing cars 104 (shown in FIG. 1). In the illustrated embodiment, the non-propulsion electric loads 118 that are disposed in the lead powered unit 102 include a battery charger 408 ("Redundant Batt Charge"), electric circuits 412, a heating, ventilation, and air cooling ("HVAC") subsystem 414, blowers 404 ("Alt Blr2", "HEP Blr"), compressors 406 ("CMP"), and engine heaters or other layover protection equipment 410. Similar or different non-propulsion electric loads 112 may be included in one or more of the trailing cars 104. Alternatively, different non-propulsion electric loads 118, 112 may be provided.

In the illustrated embodiment, inverters 434 ("INV 5", "INV 6"), a switch 436, and a filter 438 couple the non-propulsion electric loads 112, 118 (shown in FIG. 1) with the bus 402. The inverters 434 may convert a direct current on the bus 402 with an alternating current of a predetermined magnitude and frequency that is fed to the switch 436. By way of example only, the inverters 434 may convert the direct current of the bus 402 with a 480 volt, 60 Hz, three phase alternating current. Alternatively, the frequency of the current that is output from the inverters 434 may be a different frequency. For example, the output current from the inverters 434 may be less than 60 Hz. The switch 436 alternates between closed and open positions to alternatively couple and decouple the inverters 434 with the non-propulsion electric loads 112, 118. For example, the switch 436 may couple both inverters 434 in order to supply sufficient alternating current to the non-propulsion electric loads 112, 118. Multiple inverters 434 may be used in order to provide a backup or failsafe system. For example, if one inverter 434 fails, at least one additional inverter 434 may be available to supply the alternating current to one or more of the non-propulsion electric loads 112, 118. The filter 438 may filter out portions of the unwanted frequencies that are supplied from to the non-propulsion electric loads 112, 118, or frequencies that are not a predetermined frequency or that are outside of a predetermined range of frequencies.

A circuit breaker 428 is coupled to the filter 438. The circuit breaker 428 may include fuses that provide safeguards against overloading one or more components that are joined with the circuit breaker 428. For example, the circuit breaker 428 may include fuses that protect the battery charger 408, engine heater 410, circuits 412, HVAC subsystem 414, and the like, from voltage and/or current spikes. A contactor 426 ("HEPC") is located downstream from the circuit breaker 428 in the illustrated embodiment. The contactor 426 may be an electronically controlled switch or relay disposed between the circuit breaker 428 and one or more of the non-propulsion electric loads 112, 118 (shown in FIG. 1). Similar to the switch 436, the contactor 426 may alternate between closed and open positions to alternatively deliver and prevent delivery of current to one or more of the non-propulsion electric loads 112, 118.

The battery charger 408 may be an alternate or backup source of power for the non-propulsion electric loads 112, 118 (shown in FIG. 1). For example, the battery charger 408 may supply electric current to the HVAC subsystem 414 and circuits 412 if the HEP alternator 204 is unable to generate current for the auxiliary circuit 116. In one embodiment, an external source of power may be used to supply current to the battery charger 408 when the engine 108 (shown in FIG. 1) is turned off or is not moving. The battery charger 408 may be coupled with the bus 402 by way of a transformer 424 ("RBC XFmr+Circ Breaker"). The transformer 424 provides electrical isolation of the auxiliary circuit 116 from the source of external power when the battery is being charged by the battery charger 408. The transformer 424 may include a circuit breaker or other protective equipment. The HVAC subsystem 414 provides ventilation to the lead powered unit 102 (shown in FIG. 1). In one embodiment, the HVAC subsystem 414 may include separate heating, cooling, and ventilation subsystems. Additional HVAC subsystems 414 may be provided in the trailing cars 104 (shown in FIG. 1) as the non-propulsion electric loads 118.

The electric circuits 412 may represent one or more circuits that supply current to the lead powered unit 102 (shown in FIG. 1). Additional electric circuits 412 may be included in the trailing cars 104 (shown in FIG. 1) as the non-propulsion electric loads 118 (shown in FIG. 1). For example, the circuits 412 may deliver current to electrical outlets and other interfaces that permit passengers to receive the current for devices of the passengers, such as electric razors, computers, and the like. One or more of the circuits 412 may include a light source that provides light in the trailing cars 104. The circuits 412 alternatively may supply current to one or more other devices or components than those described above.

The blowers 404 are coupled with the bus 402 by inverters 416 ("HAux Inv1", "HAux Inv2") and filters 418. The inverters 416 convert the direct current of the bus 402 into alternating current and the filters 418 filter the current prior to delivery of the current to the blowers 404. The blowers 404 may include fans that move air to cool a device, such as the inverters 416, 434, filters 438, a HEP field control component 454, and the like, of the auxiliary circuit 116. The compressor 406 may be an air compressor for a supplying compressed air for a braking system in the lead powered unit 102 (shown in FIG. 1) and/or the trailing cars 104 (shown in FIG. 1). As shown in FIG. 4, the compressor 406 may be coupled with the bus 402 by a filter 420 and a contactor 422. The contactor 422 may be a switch that allows the compressor 406 to be coupled and decoupled from the auxiliary circuit 116. The filter 420 may filter the current supplied to the compressor 406.

The engine heater 410 includes a device that heats or warms the engine 108 (shown in FIG. 1) of the lead powered unit 102 (shown in FIG. 1). For example, the engine heater 410 may warm up an idle engine 108 in relatively cold environments prior to starting the engine 108. The engine heater 410 may be coupled with an external power source when the engine 108 is turned off in order to heat the engine 108.

The bus 402 is coupled with the HEP field control component 454. In the illustrated embodiment, the HEP field control component 454 includes an H-bridge 442, a transformer 444 ("Xformer"), and a phase control rectifier 448 ("PRP2"). The H-bridge 442 is joined with the transformer 444 and may include a circuit that allows the direct current of the bus 402 to be applied across the transformer 444 in either direction. The transformer 444 is joined with a bus 446 that extends from the HEP alternator 204 to the transformer 444. The phase control rectifier 448 is disposed between the transformer 444 and the HEP alternator 204 along the bus 402.

The HEP field control component 454 controls the magnitude, or voltage, of the field current that is supplied to the field windings 452 of the HEP alternator 204. The HEP field control component 454 may increase or decrease the voltage of the field current in order to ensure that the HEP alternator 204 outputs an approximately constant voltage. For example, the HEP field control component 454 may change the voltage applied to the field windings 452 so that the voltage that is output from the HEP alternator 204 is independent of the speed at which the engine 108 (shown in FIG. 1) operates. As the engine 108 slows down, the HEP field control component 454 increases the magnitude, or voltage, of the field current so that the voltage generated by the HEP alternator 204 does not decrease and remains within a predetermined range of voltages, or between upper and lower threshold voltages. As a result, the engine 108 may be able to operate at a lower speed and generate less acoustic noise while the auxiliary circuit 116 receives sufficient voltage to power the non-propulsion electric loads 112, 118 (shown in FIG. 1). Conversely, as the engine 108 speeds up, the HEP field control component 454 decreases the voltage of the field current so that the voltage generated by the HEP alternator 204 does not fall outside of the predetermined range of voltages. By way of example only, the HEP field control component 454 may change the voltage supplied to the field windings 452 such that the voltage generated by the HEP alternator 204 does not fall outside of the range of 750 to 850 volts when the engine 108 is operating.

The voltage on the bus 402 that is regulated by the field control component 454 and that is supplied to the field windings 452 may be controlled by the field control component 454 to be at least as great as, but not significantly larger than, a threshold voltage that is demanded by the auxiliary circuit 116. The field control component 454 may reduce or regulate the voltage on the bus 402 to be approximately the same as the voltage demanded by the non-propulsion electric loads 112, 118 (shown in FIG. 1). For example, the field control component 454 may reduce the voltage on the bus 402 to be as low as possible while still be large enough to power the non-propulsion loads 112, 118 of the auxiliary circuit 116. Reducing the voltage on the bus 402 to be just large enough to meet the power demands of the auxiliary circuit 116 may decrease the filtering requirements of the filter 438 and/or to reduce power dissipation losses in the inverters 434. For example, without a significant excess voltage on the bus 402 that exceeds the power demanded by the auxiliary circuit 116, smaller filters 438 and/or inverters 434 may be used to meet the filtering requirements and loss limitations of the auxiliary circuit 116. Additionally, smaller filters 438 and/or inverters 434 typically generate less heat than larger filters 438 and/or inverters 434. As a result, the blower 404 may need to pass less air over the filter 438 and/or inverters 434 to cool the filter 438 and/or inverters 434.

Figure 5:
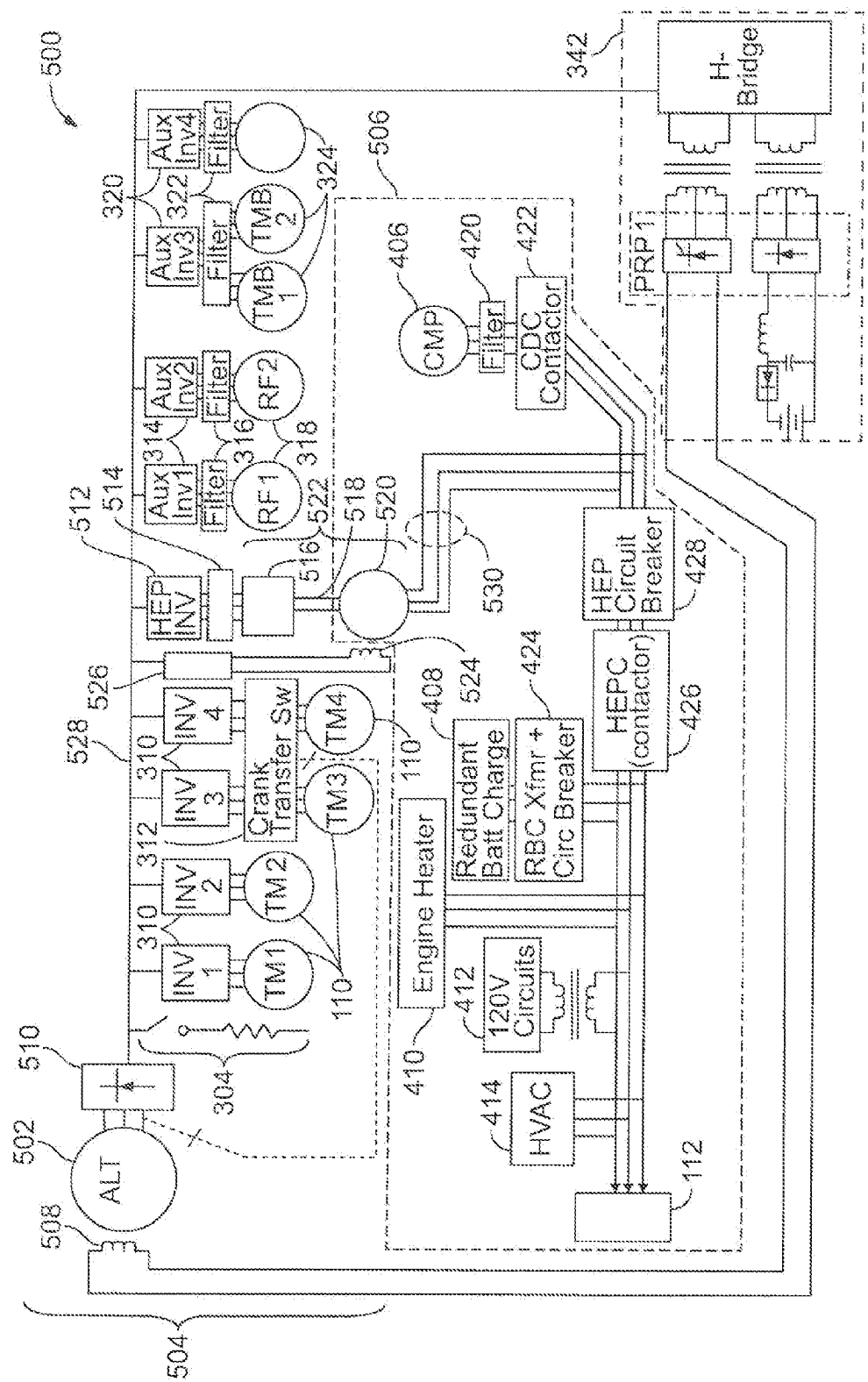
FIG. 5 is a diagram of an auxiliary circuit of the power distribution system shown in FIG. 2 in accordance with another embodiment.

FIG. 5 is a diagram of a power distribution system 500 in accordance with another embodiment. The system 500 distributes current to propulsion electric loads and non-propulsion electric loads 112, 118 (shown in FIG. 1) of the rail vehicle 100 (shown in FIG. 1) from an alternator 502 ("ALT") that is joined to the engine 108 (shown in FIG. 1). In one embodiment, the system 500 may include a single alternator 502 that is coupled to the shaft 206 (shown in FIG. 2) of the engine 108 and that generates current for both a tractive circuit 504 and an auxiliary circuit 506, as opposed to multiple alternators that separately produce current for tractive and auxiliary circuits. Alternatively, the system 500 may include multiple alternators 502.

As the engine 108 (shown in FIG. 1) rotates the shaft 206 (shown in FIG. 2), the alternator 502 creates electric current that is based on the speed at which the engine 108 rotates the shaft 206 and the field current that is supplied to field windings 508 of the alternator 502. As described above, when the engine 108 operates at faster speeds and/or greater voltages that are applied to the field windings 508 may result in larger voltages being produced by the alternator 502. For example, the voltage created by the alternator 502 may increase with faster engine 108 speeds and/or increasing voltages of the field current. Conversely, slower engine 108 speeds and/or lower voltages of field currents may result in smaller voltages produced by the alternator 502.

In the illustrated embodiment, the alternator 502 generates an alternating current that is supplied to a rectifier 510. Similar to as described above in connection with the tractive circuit 114 (shown in FIG. 1), the rectifier 510 converts the alternating current into a direct current. The direct current is supplied to a bus 528 of the tractive circuit 504 that delivers the current to various propulsion electric loads of the tractive circuit 504, including grid resistor legs 304, inverters 310, 314, 320, traction motors 110, switches 312, filters 316, 322, fans 318, blowers 324, field control component 342, and the like. The bus 528 may be similar to the bus 302 (shown in FIG. 3) of the tractive circuit 114. As described above, the current is delivered to the propulsion electric loads of the tractive circuit 504 along the bus 528 in order to propel the rail vehicle 100 (shown in FIG. 1) along the track 106 (shown in FIG. 1) and perform other functions involved with propelling the rail vehicle 100.

A HEP inverter 512 ("HEP INV") is coupled with the bus 528 of the tractive circuit 504. The HEP inverter 512 converts the direct current on the bus 528 to alternating current that is fed to a contactor 514. The contactor 514 is a switch that allows the auxiliary circuit 506 to be coupled and decoupled from the tractive circuit 504. While only one HEP inverter 512 and a single contactor 514 are shown, alternatively multiple HEP inverters 512 and/or contactors 514 may be provided. The current on the tractive circuit 504 is supplied to a HEP motor-generator set 522 of the auxiliary circuit 506. The current powers a HEP motor 516 of the HEP motor-generator set 522 to rotate or move a shaft 518. In one embodiment, the HEP motor 516 rotates the shaft 518 at an approximately constant speed or frequency, or at a speed or frequency that is independent of the speed or frequency at which the engine 108 (shown in FIG. 1) is turned on and operating. For example, the HEP motor 516 may operate at an approximately constant speed while the speed of the engine 108 may vary. The HEP motor 516 may rotate the shaft 518 at a speed that falls within a predetermined range of speeds, or between upper and lower predetermined speed thresholds. By way of example only, the predetermined range of speeds may be between +/−5%, 10%, 20% or some other percentage of a predetermined speed.

A HEP generator 520 of the HEP motor-generator set 522 is coupled to the HEP motor 516 and generates current based on movement of the HEP motor 516. For example, the HEP generator 520 may be joined to the shaft 518 and may create electric current based on rotation of the shaft 518 by the HEP motor 516. As shown in FIG. 5, the HEP motor-generator set 522 provides electric isolation between the tractive and auxiliary circuits 504, 506. For example, the HEP motor-generator set 522 may joined to and extend between the tractive and auxiliary circuits 504, 506 but may not provide a conductive pathway that transfers electric current from the tractive circuit 504 to the auxiliary circuit 506, and vice-versa.

In one embodiment, the HEP motor-generator set 522 is configured to rotate the shaft 518 at speeds that are faster than the speeds at which the engine 108 (shown in FIG. 1) is capable of operating. For example, the HEP motor-generator set 522 may be capable of operating at a speed of between 3500 and 3700 rpm while the engine 108 may be limited to operating at a speed of approximately 1000 rpm or less. Alternatively, the HEP motor 516 rotates the shaft 518 at a different speed, such as between 1700 and 1900 rpm. Providing a HEP motor-generator 522 that is capable of operating at higher speeds than the engine 108 may allow for a smaller and/or lighter HEP motor-generator 522 to be used when compared to motors and generators that are incapable of operating at such higher speeds.

The HEP generator 520 has a magnetic field through which a rotor winding moves based on rotation of the shaft 518 in order to create an electric current that is output from the HEP generator 520. In the illustrated embodiment, the HEP generator 520 includes field windings 524 that generate the magnetic field. The field windings 524 are joined with the bus 528 by a field control component 526. The field control component 526 may be similar to the field control component 342 or 454 (shown in FIGS. 3 and 4). The field control component 526 receives direct current from the bus 528 and varies the voltage and/or the frequency of the field current that is supplied to the field windings 524. In another embodiment, the field windings 524 may be coupled to a power source, such as a battery, that provides the field current to the field windings 524. Alternatively, the HEP generator 520 may include a permanent magnet that provides the magnetic field.

The HEP generator 520 provides an alternating current to a bus 530 of the auxiliary circuit 506. For example, the HEP generator 520 may include multiple windings around the stator of the HEP generator 520 such that an alternating current is produced when the rotor of the HEP generator 520 rotates within the magnetic field of the HEP generator 520 due to rotation of the shaft 518. In one embodiment, the HEP generator 520 produces a three phase, 60 Hz alternating current based on rotation of the shaft 518. Alternatively, a different phase and/or frequency of alternating current may be generated. For example, the HEP generator 520 may produce a lower frequency current. The HEP generator 520 may include a different number of windings in the stator of the HEP generator 520 to produce a different voltage and/or phase of alternating current.

While only a single HEP generator 520 is shown in FIG. 5, alternatively, multiple HEP generators 520 may be coupled with the shaft 518. Different HEP generators 520 may produce currents having different frequencies and/or phases. For example, a first HEP generator 520 joined to the shaft 518 may be configured to produce current having a first frequency and/or phase while a second HEP generator 520 joined to the shaft 518 may be configured to produce current having a different second frequency and/or phase based on common movement of the shaft 518. The field current supplied to the field windings 524 may be changed based on the frequency and/or power demands of the auxiliary circuit 506. The current that is created by the HEP generator 520 is supplied to the non-propulsion electric loads 112, 118 (shown in FIG. 1) of the auxiliary circuit 506, including the compressor 406, filter 420, contactors 422, 426, circuit breaker 428, battery charger 408, electric circuits 412, HVAC subsystem 414, and other electric loads 118 in the trailing cars 104 (shown in FIG. 1).

In operation, the alternator 502 provides the current that powers the propulsion electric loads of the tractive circuit 504 to propel the rail vehicle 100. This current also powers the HEP motor-generator set 522 to provide current for the auxiliary circuit 506. The HEP motor 516 may rotate the shaft 518 at a predetermined speed so that the HEP generator 520 produces an output current having a predetermined frequency, such as 60 Hz. Alternatively, the HEP motor 516 may increase the speed at which the shaft 518 is rotated to increase the frequency of the output current or may decrease the speed at which the shaft 518 is rotated to decrease the frequency of the output current.

The voltage of the output current from the HEP motor-generator set 522 is based on the voltage of the field current that is supplied to the field windings 524. The voltage of the field current may vary based on the power demand of the auxiliary circuit 506. For example, as the power demanded by the non-propulsion electric loads 112, 118 (shown in FIG. 1) of the auxiliary circuit 506 increases, the voltage applied to the field windings 524 may be increased. Conversely, as the power demanded by the non-propulsion electric loads 112, 118 decreases, the voltage applied to the field windings 524 may decrease.

If the power demand of the auxiliary circuit 506 is relatively low, the voltage supplied to the motor 516 may vary between relatively high and low voltages because the HEP motor 516 is permitted to operate at relatively low or high voltage. For example, if the power demand of the auxiliary circuit 506 is low, then the HEP motor 516 may operate at a low or high voltage while still providing predetermined speed of operation to HEP generator 520 and thus providing constant voltage and frequency for the non-propulsion loads 112, 118 (shown in FIG. 1).

The HEP motor 516 may operate at relatively high voltage to produce sufficient current and/or voltage to the auxiliary circuit 506 even when the engine 108 (shown in FIG. 1) operates at relatively slow speeds or at maximum or relatively fast speeds of the engine 108. In one embodiment, the HEP motor 516 is configured to rotate at higher speeds than the engine 108. Since the speed of the motor generator set is much larger, the size and weight of the motor generator set can be reduced.

In one embodiment, the rail vehicle 100 (shown in FIG. 1) may include a regenerative braking system that creates current when the rail vehicle 100 slows down or brakes. The regenerated current may be delivered to the HEP motor-generator set 522 by way of the HEP inverter 512 as the voltage that is input to the HEP motor 516.

Figure 6:
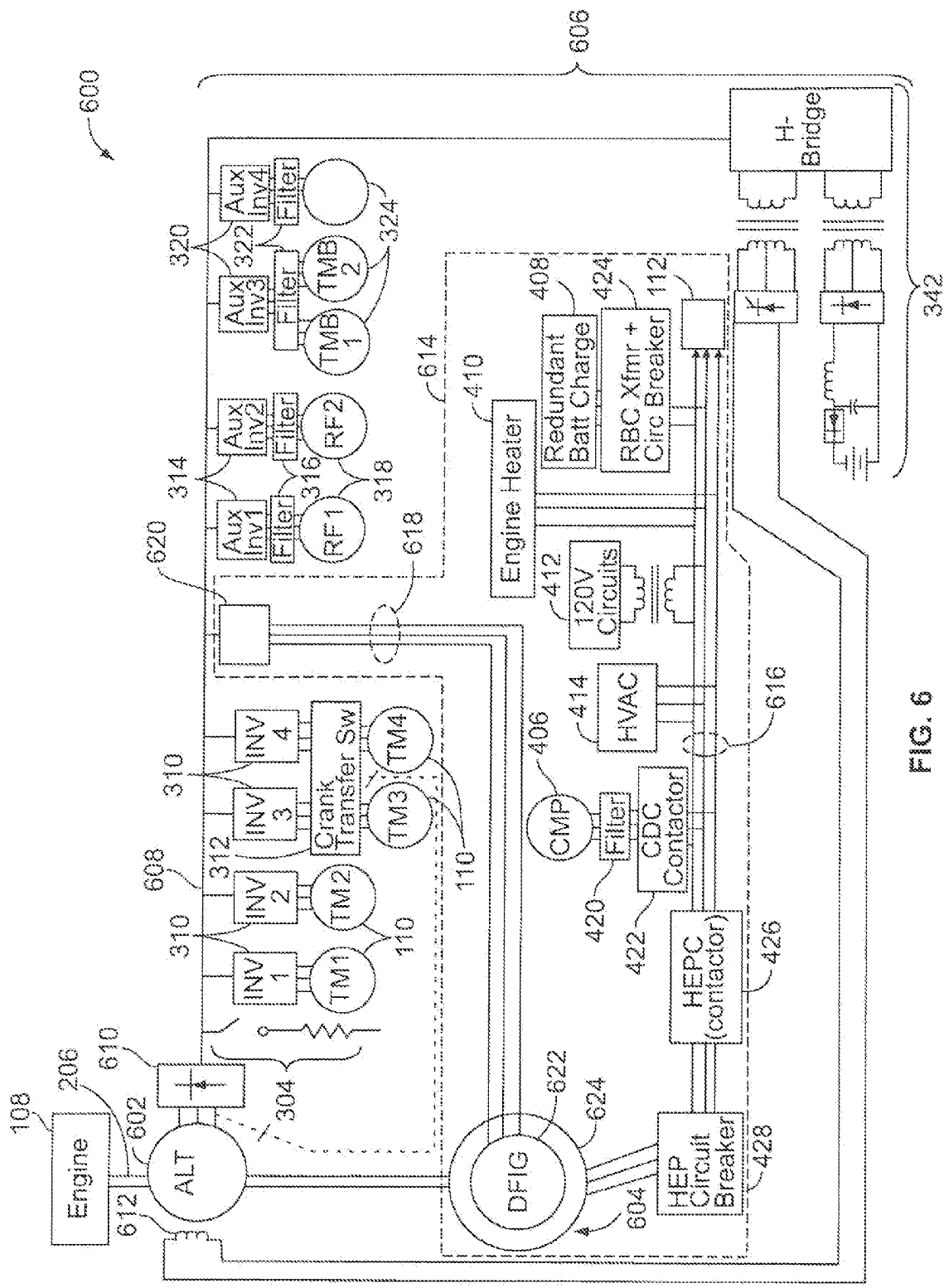
FIG. 6 is a power distribution system of the powered rail vehicle shown in FIG. 1 in accordance with another embodiment.

FIG. 6 is a power distribution system 600 in accordance with another embodiment. The power distribution system 600 distributes current to propulsion electric loads and non-propulsion electric loads 112, 118 (shown in FIG. 1) of the rail vehicle 100 (shown in FIG. 1) from an alternator 602 ("ALT") and a generator 604 ("DFIG") that are joined to the engine 108. For example, both the alternator 602 and the generator 604 may be joined to the shaft 206 of the engine 108. The alternator 602 and the generator 604 create electric current based on common movement of the shaft 206. The alternator 602 produces current for propulsion electric loads of a tractive circuit 606 and the generator 604 produces current for non-propulsion electric loads 112, 118 of an auxiliary circuit 614. For example, similar to as described above in connection with the tractive circuits 114, 504 (shown in FIGS. 1 and 5), the current generated by the alternator 602 is supplied to a bus 608 that delivers the current to various propulsion electric loads along the tractive circuit 606, including grid resistor legs 304, inverters 310, 314, 320, traction motors 110, switches 312, filters 316, 322, fans 318, blowers 324, field control component 342, and the like.

The alternator 602 generates electric current that is supplied to the tractive circuit 606 along the bus 608. The current may be generated as alternating current and converted to direct current by a rectifier 610. The bus 608 may be similar to the bus 302 (shown in FIG. 3) of the tractive circuit 114 and/or the bus 528 (shown in FIG. 5) of the tractive circuit 504. The voltage of the field current supplied to field windings 612 of the alternator 602 may be varied based on the speed of the engine 108 in order to compensate for changing speeds of the engine 108, as described above.

The auxiliary circuit 614 includes a bus 616 that transmits current produced by the generator 604 to the non-propulsion electric loads 112, 118 (shown in FIG. 1) of the lead powered unit 102 (shown in FIG. 1) and/or trailing cars 104 (shown in FIG. 1). For example, the auxiliary circuit 614 may supply current from the generator 604 to non-propulsion electric loads 112, 118 such as the HVAC subsystem 414, the electric circuits 412, the battery charger 408, the contactor 426, the compressor 406, and other non-propulsion electric loads 118 in the trailing cars 104, as described above.

In the illustrated embodiment, the tractive and auxiliary circuits 606, 614 are electrically coupled with each other in a non-transformed manner. For example, electric current may be conveyed between the tractive and auxiliary circuits 606, 614 not through or across a transformer, but along a conductive pathway or bus 618 that is joined to and extends between the tractive and auxiliary circuits 606, 614. The current produced by the alternator 602 and conveyed along the bus 608 is supplied to a HEP inverter 620. Alternatively, the HEP inverter 620 may receive current from a power source other than the alternator 602, such as a power source that is decoupled from the alternator 602. For example, the HEP inverter 620 may receive current from a battery or the bus 616 of the auxiliary circuit 614. The HEP inverter 620 converts the direct current on the bus 608 to an alternating current that is transmitted along the bus 618 to the generator 604.

The generator 604 is a double-fed induction generator in the embodiment shown in FIG. 6. For example, the generator 604 may be an induction generator that includes field (or rotor) windings 622 and stator windings 624. The field windings 622 receive a field current from the HEP inverter 620 to create a magnetic field. In the illustrated embodiment, the field windings 622 receive a multiphase alternating current from the HEP inverter 620, such as a three phase current, to create the magnetic field of the generator 604. The field windings 622 are joined with the shaft 206 and move based on movement of the shaft 206. The movement of the field windings 622 generates an electric current that is output from the generator 604. The current that is output by the generator 604 may be an alternating current that is delivered to the bus 616 of the auxiliary circuit 614 in order to power the non-propulsion electric loads 112, 118 (shown in FIG. 1), such as the compressor 406, HVAC subsystem 414, electric circuits 412, battery charger 408, and the like.

The frequency and/or magnitude of the current that is output from the generator 604 may be based on the field current that is supplied to the field windings 622 by the HEP inverter 620. The HEP inverter 620 changes the frequency and/or magnitude of the output current by varying the frequency and/or magnitude of the field current that is transmitted to the field windings 622. In one embodiment, HEP inverter 620 may base the voltage of the field current on the speed of the engine 108. For example, the HEP inverter 620 may vary the voltage that is applied to the field windings 622 in order to provide an output current from the generator 604 having a predetermined voltage that is independent of the speed of the engine 108. When the engine 108 slows down rotation of the shaft 206, the HEP inverter 620 may increase the voltage applied to the field windings 622 so that the voltage that is output from the generator 604 remains within a predetermined range. Conversely, when the engine 108 speeds up, the HEP inverter 620 may decrease the voltage applied to the field windings 622 such that the voltage of the output current from the generator 604 remains in the predetermined range of voltages. In one embodiment, the predetermined range of voltages includes 480 volts. For example, the predetermined range may extend between 470 and 490 volts.

The HEP inverter 620 may base the frequency of the field current that is applied to the field windings 622 in response to changing speeds of the engine 108 and/or changing frequency demands of the auxiliary circuit 614. For example, the HEP inverter 620 may change the frequency of the field current in order to provide an output current from the generator 604 having a predetermined frequency or a frequency that falls within a predetermined range of frequencies. The generator 604 produces electric current having a base frequency that is dependent on movement of the engine 108 and the frequency of the field current. When the engine 108 slows down rotation of the shaft 206, the HEP inverter 620 may increase the frequency of the field current so that the base frequency of the output current from the generator 604 is increased and the output current has a frequency within a predetermined range of frequencies. Conversely, when the engine 108 speeds up, the HEP inverter 620 may decrease the frequency of the field current such that the base frequency is reduced and the frequency of the output current remains in the predetermined range of frequencies. In one embodiment, the frequency of the field current modifies the frequency of the output current by the same amount. For example, a field current having a frequency of 10 Hz would increase the frequency of the output current by 10 Hz from the base frequency. A field current having a frequency of −10 Hz would decrease the frequency of the output current by 10 Hz from the base frequency. If the frequency of the output current is within the predetermined range of frequencies at a current speed of the engine 108, then the HEP inverter 620 may supply a direct current to the generator 604 as the field current. For example, the HEP inverter 620 may deliver a current having no frequency if the speed of the engine 108 is sufficient to generate an output current from the generator 604 that falls within the predetermined range of frequencies.

By way of example only, if the engine 108 is operating at a speed of 900 rpm, then the operating speed of the engine 108 is sufficient to cause the generator 604 to output a current of 480 volts and 60 Hz with a direct current voltage having a frequency of 0 Hz applied to the field windings 622. If the engine 108 slows down to a speed of 750 rpm, then the HEP inverter 620 may increase the voltage and/or the frequency of the field current. For example, at a speed of 750 rpm, the engine 108 may cause the generator 604 to create an output current of 480 volts and 50 Hz if the frequency of the field current is not modified. In such a situation, the HEP inverter 620 may apply the field current at a frequency of 10 Hz in order to increase the output current to the predetermined 60 Hz frequency. In another example, at a speed of 1050 rpm, the engine 108 may cause the generator 604 to create an output current of 480 volts and 70 Hz if the frequency of the field current is not modified. In such a situation, the HEP inverter 620 may apply the field current at a frequency of −10 Hz in order to decrease the output current to the predetermined 60 Hz frequency. While a 60 Hz current is output from the generator 604 in the above examples, alternatively the generator 604 may produce a current having a different frequency. For example, the generator 604 may output a lower frequency current.

The use of a variable frequency and voltage HEP inverter 620 may reduce the weight of the power distribution system 600 when compared to other power distribution systems. For example, the use of a variable frequency HEP inverter 620 may allow the HEP inverter 620 to supply a non-filtered alternating current as the field current to the generator 604. As a result, the variable frequency HEP inverter 620 may avoid the need for filters between the HEP inverter 620 and the generator 604 that remove unwanted frequencies. Such filters can be relatively heavy and reducing the need for such filters reduces the weight of the system 600. Additionally, the HEP inverter 620 may have a relatively low power rating when compared to other inverters used in power distribution systems for rail vehicles. The lower power rating can result in a HEP inverter 620 that is lighter when compared to inverters having higher power ratings.

The speed at which the engine 108 operates may be controlled in order to provide sufficient power for the tractive circuit 606 to propel the rail vehicle 100 (shown in FIG. 1) and to enable the HEP inverter 620 and generator 604 to produce sufficient power for the auxiliary circuit 614. As the power demand of the tractive and auxiliary circuits 606, 614 increases, the engine 108 may need to increase the speed at which the shaft 206 is rotated to meet the increased power demand. Conversely, as the power demand of the tractive and auxiliary circuits 606, 614 decreases, the engine 108 may slow down. The generator 604 may supply power to the tractive circuit 606 when the engine 108 is operating at relatively slow speeds. For example, the generator 604 may create electric current that is fed to the tractive circuit 606 through the HEP inverter 620 when the engine 108 is operating at an idling speed or another relatively low speed.

In one embodiment, the rail vehicle 100 (shown in FIG. 1) may include a regenerative braking system that creates current when the rail vehicle 100 slows down or brakes. As described above, this regenerated current may be delivered to the generator 604 by way of the HEP inverter 620 as the rotor current that is input to the generator 604. For example, when the engine 108 is operating at a speed of 750 rpm, approximately one-sixth of the electric power obtained from the regenerated current is supplied to the generator 604 as the rotor current from the tractive circuit 606.

Another embodiment relates to a power distribution system for a rail vehicle. The system comprises a propulsion alternator, a first bus, an HEP alternator, and a second bus. The propulsion alternator is coupled to an engine of the rail vehicle. The first bus is joined with the propulsion alternator and electrically couples the propulsion alternator with a propulsion electric load that propels the rail vehicle. The HEP alternator is joined to the engine. The second bus is coupled with the HEP alternator and electrically joins the HEP alternator with a non-propulsion electric load of the rail vehicle. The propulsion alternator and HEP alternator separately generate electric currents to power the propulsion electric load and the non-propulsion electric load, respectively. That is, the propulsion alternator generates a first electric current (transmitted over the first bus) to power the propulsion electric load, and the HEP alternator generates a second, separate electric current (transmitted over the second bus) to power the non-propulsion electric load. The HEP alternator and the second bus are electrically separate from the propulsion alternator and the first bus. As used in describing this embodiment and all the other embodiments herein, the terms "join" and "couple" are used interchangeably to refer to a mechanical and/or electrical connection, as applicable.

In another embodiment, the power distribution system further comprises a field control component electrically joined with the HEP alternator by the second bus. The field control component reduces a voltage of the second electric current transmitted along the second bus to be approximately equivalent to a voltage demand of the non-propulsion electric load. In one embodiment, "approximately" equivalent means within 10% of a value. For example, the voltage of the second electric current may be approximately equivalent to the voltage demand of the non-propulsion electric load when the voltage of the second electric current is within 10% of the voltage demand. Alternatively, the voltage of the second electric current may be approximately equivalent to the voltage demand when the voltage of the second electric current is within a different percentage of the voltage demand, such as within 5%, 20%, or 25%.

Another embodiment relates to a power distribution system for a rail vehicle. The system comprises an alternator, a bus, and an HEP motor/generator set. The alternator is coupled to an engine of the rail vehicle and generates electric current based on movement of the engine. The bus receives the electric current from the alternator and supplies the electric current to a propulsion electric load that propels the rail vehicle. The HEP motor/generator set is coupled with the bus, and includes an HEP motor powered by the electric current from the bus and a generator joined with the HEP motor. The generator creates electric current for an auxiliary circuit based on movement of the HEP motor to power a non-propulsion electric load of the auxiliary circuit.

Another embodiment relates to a power distribution system for a rail vehicle. The system comprises an alternator and a generator. The alternator is coupled to an engine of the rail vehicle. The alternator generates a first electric current for a propulsion electric load of the rail vehicle based on movement of the engine. The generator is coupled to the engine and includes field windings that receive a field current to generate a magnetic field. The generator creates a second electric current to power a non-propulsion electric load of the rail vehicle. The second electric current created by the generator is based on movement of the engine and the field current.

Another embodiment relates to a rail vehicle. The rail vehicle comprises an engine having a primary output shaft, a propulsion alternator, and an HEP alternator. The propulsion alternator and HEP alternator are commonly mechanically connected to the primary output shaft of the engine, such that when the primary output shaft is rotated or turned through operation of the engine, the propulsion alternator creates a first electrical current, and the HEP alternator separately creates a second electrical current. In one aspect, the first current may be supplied to a first bus for powering a propulsion electric load of the vehicle, and the second current may be supplied to a second bus for powering a non-propulsion electric load of the vehicle, where the HEP alternator and the second bus are electrically separate or isolated from the propulsion alternator and the first bus.

In an embodiment, the propulsion alternator and tractive circuit are rated at a first high power level, specifically, from 2500 kilowatts to 3500 kilowatts, and the HEP alternator (and/or HEP motor-generator set 522 and/or and generator 604) and auxiliary circuit are also rated at a second high power level, specifically, from 500 kilowatts to 1,000 kilowatts.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution system for a vehicle, the system comprising:
   an alternator configured to be joined to an engine of the vehicle, the alternator generating a first electric current for a propulsion electric load of the vehicle based on movement of the engine;
   a generator configured to be joined to the engine and including field windings that receive a field current to generate a magnetic field, the generator creating a second electric current to power a non-propulsion electric load of the vehicle, wherein the second electric current created by the generator is based on movement of the engine and the field current; and
   a Head End Power (HEP) inverter configured to be electrically joined with the generator, the HEP inverter configured to receive the first electric current from the alternator and to supply the field current to the generator.

2. The power distribution system of claim 1, wherein the first electric current is a direct current, the field current is an alternating current, and the HEP inverter is configured to convert the direct current first electric current to the alternating current field current before supplying the field current to the generator.

3. The power distribution system of claim 1, wherein the HEP inverter is configured to receive a third electric current in a non-transformed manner from a power source that is decoupled from the alternator.

4. The power distribution system of claim 1, wherein the alternator is configured to generate the first electric current for the propulsion electric load of a tractive circuit of the vehicle and the generator is configured to create the second electric current for the non-propulsion electric load of an auxiliary circuit of the vehicle based on common movement of the engine.

5. The power distribution system of claim 1, wherein the alternator and the generator are configured to be coupled to a shaft of the engine.

6. The power distribution system of claim 1, wherein the generator is configured to receive the field current having a voltage that changes based on a speed of the engine.

7. The power distribution system of claim 1, wherein the generator is configured to receive the field current having a frequency that changes based on a speed of the engine.

8. The power distribution system of claim 1, wherein the generator is configured to receive the field current having a frequency that is based on a frequency demand of the non-propulsion electric load.

9. The power distribution system of claim 1, wherein the generator is configured to receive the field current as a non-filtered alternating current.

10. The power distribution system of claim 1, wherein the alternator is configured to generate the first electric current for the propulsion electric load of a tractive circuit of the vehicle and the generator is configured to create the second electric current for the non-propulsion electric load of an auxiliary circuit of the vehicle, the tractive and auxiliary circuits electrically coupled with each other in a non-transformed manner.

11. The power distribution system of claim 1, wherein the tractive circuit is joined to the auxiliary circuit by a bus such that the field current is conveyed between the tractive and auxiliary circuits through the bus.

12. The power distribution system of claim 1, wherein the field windings of the generator are coupled with a shaft of the engine, the field windings configured to move based on movement of the shaft to generate the second electric current.

13. The power distribution system of claim 1, wherein the generator is configured to receive the field current having a voltage that changes to cause the generator to create the second electric current with a predetermined voltage that is independent of a speed at which the engine operates.

14. The power distribution system of claim 1, wherein the generator is configured to receive the field current having a voltage that changes inversely to a change in a speed of the engine to cause the generator to create the second electric current having a voltage within a predetermined range of voltages.

15. The power distribution system of claim 14, wherein the predetermined range of voltages is from 470 to 490 volts.

16. A power distribution system for a vehicle, the system comprising:
   an alternator configured to be joined to an engine of the vehicle, the alternator configured to generate a first electric current for a propulsion electric load of the vehicle based on movement of the engine;
   a Head End Power (HEP) inverter configured to be electrically joined with the alternator and to receive the first electric current from the alternator; and
   a generator configured to be joined to the engine and to be electrically joined with the HEP inverter, the generator including field windings that are configured to receive a field current supplied by the HEP inverter to generate a magnetic field, the generator also configured to create a second electric current to power a non-propulsion electric load of the vehicle, wherein the second electric current created by the generator is based on both movement of the engine and the field current.

17. The power distribution system of claim 16, wherein the generator is configured to create the second electric current having a frequency that is dependent on both the movement of the engine and a frequency of the field current.

18. The power distribution system of claim 16, wherein the HEP inverter is configured to receive a third electric current in a non-transformed manner from a power source that is decoupled from the alternator.

19. The power distribution system of claim 16, wherein the alternator and the generator are configured to be coupled to a shaft of the engine.

20. The power distribution system of claim 16, wherein the HEP inverter is configured to supply the field current to the generator with a voltage that changes based on a speed of the engine.

21. The power distribution system of claim 16, wherein the HEP inverter is configured to change a voltage of the field current that is supplied to the field windings of the generator to cause the generator to create the second electric current within a predetermined range of voltages.

22. The power distribution system of claim 21, wherein the HEP inverter is configured to increase the voltage of the field current when a speed of the engine decreases to cause the generator to create the second electric current with a voltage within the predetermined range of voltages.

23. The power distribution system of claim 16, wherein the HEP inverter is configured to create the field current as a direct current when a speed of the engine is sufficient for the generator to create a second electric current having a frequency within a predetermined range of frequencies.

24. A power distribution system for a vehicle, the system comprising:
- an alternator configured to be joined to an engine of the vehicle, the alternator generating a first electric current for a propulsion electric load of the vehicle based on movement of the engine;
- a generator configured to be joined to the engine and including field windings that receive a field current to generate a magnetic field, the generator creating a second electric current to power a non-propulsion electric load of the vehicle, wherein the second electric current created by the generator is based on movement of the engine and the field current; and
- a Head End Power (HEP) inverter configured to be electrically joined with the generator, wherein the HEP inverter is configured to receive a third electric current in a non-transformed manner from a power source that is decoupled from the alternator.

* * * * *